Feb. 9, 1960    M. C. ADDICKS    2,924,675
AUTOMATIC SHOVELING MACHINES AND THE LIKE
Filed Aug. 9, 1954    5 Sheets-Sheet 1
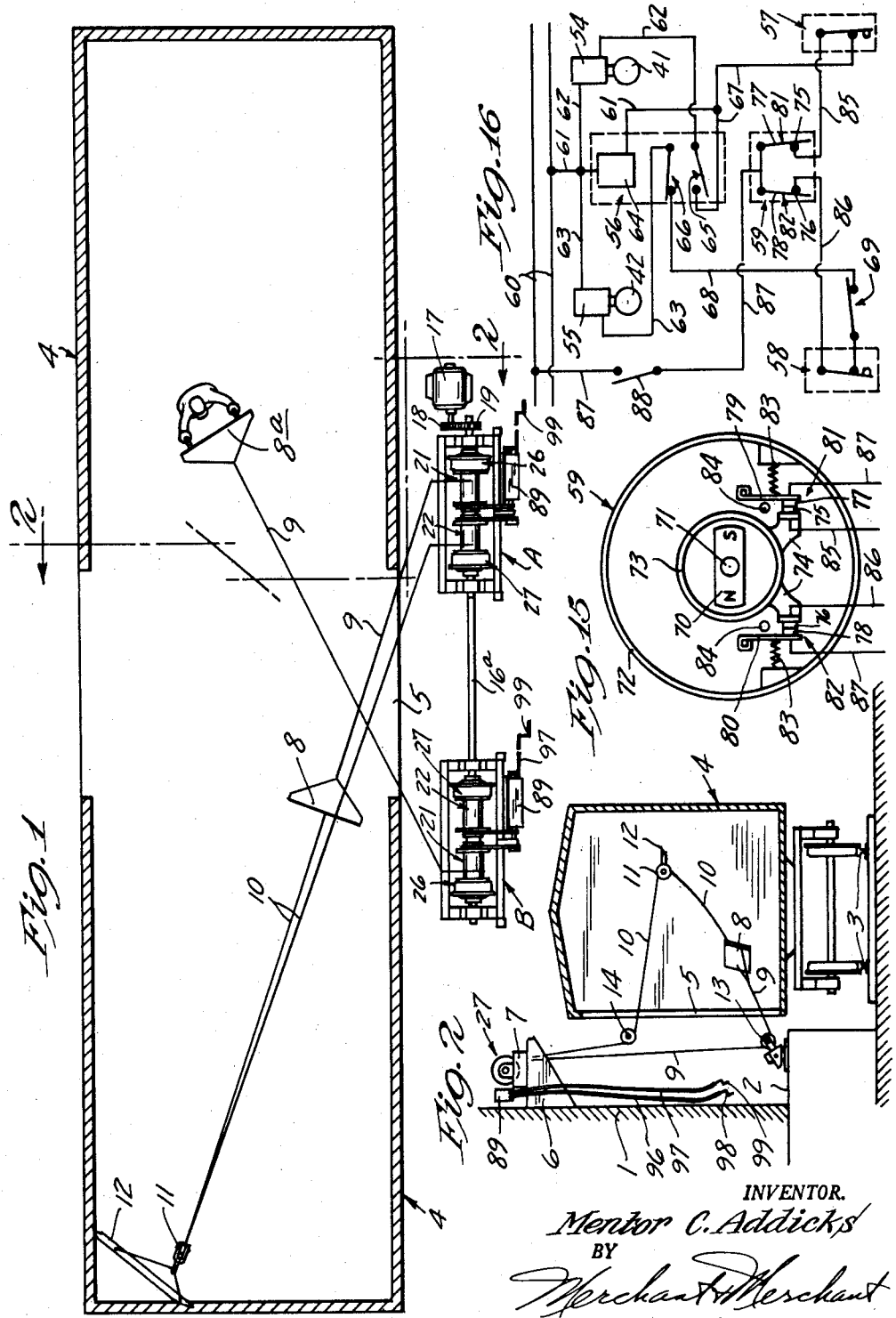
INVENTOR.
Mentor C. Addicks
BY
Merchant & Merchant
ATTORNEYS Feb. 9, 1960     M. C. ADDICKS     2,924,675
AUTOMATIC SHOVELING MACHINES AND THE LIKE
Filed Aug. 9, 1954     5 Sheets-Sheet 2

INVENTOR.
Mentor C. Addicks
BY
Merchant & Merchant
ATTORNEYS

Feb. 9, 1960   M. C. ADDICKS   2,924,675
AUTOMATIC SHOVELING MACHINES AND THE LIKE
Filed Aug. 9, 1954   5 Sheets-Sheet 3
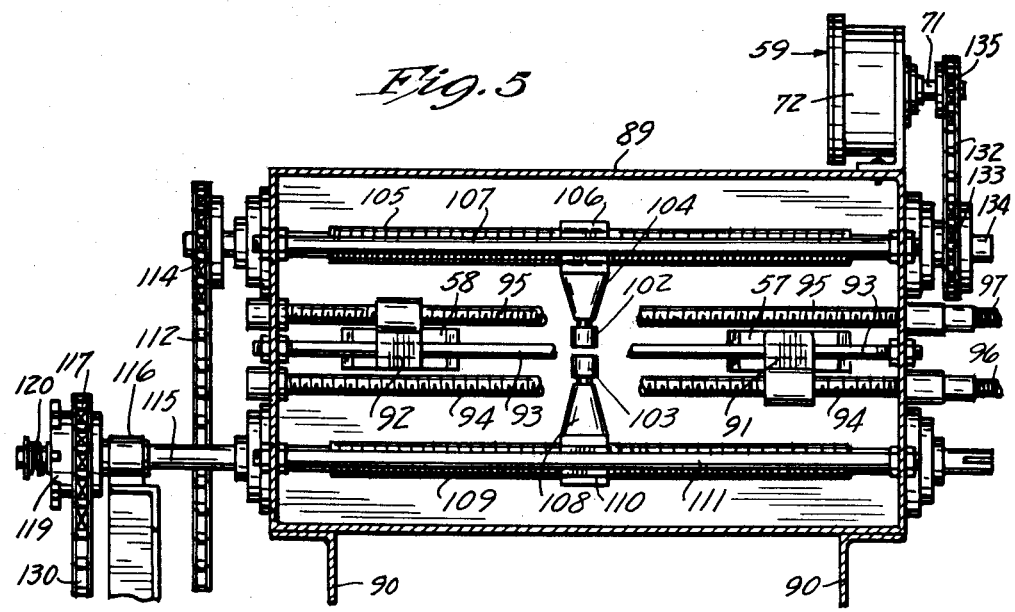
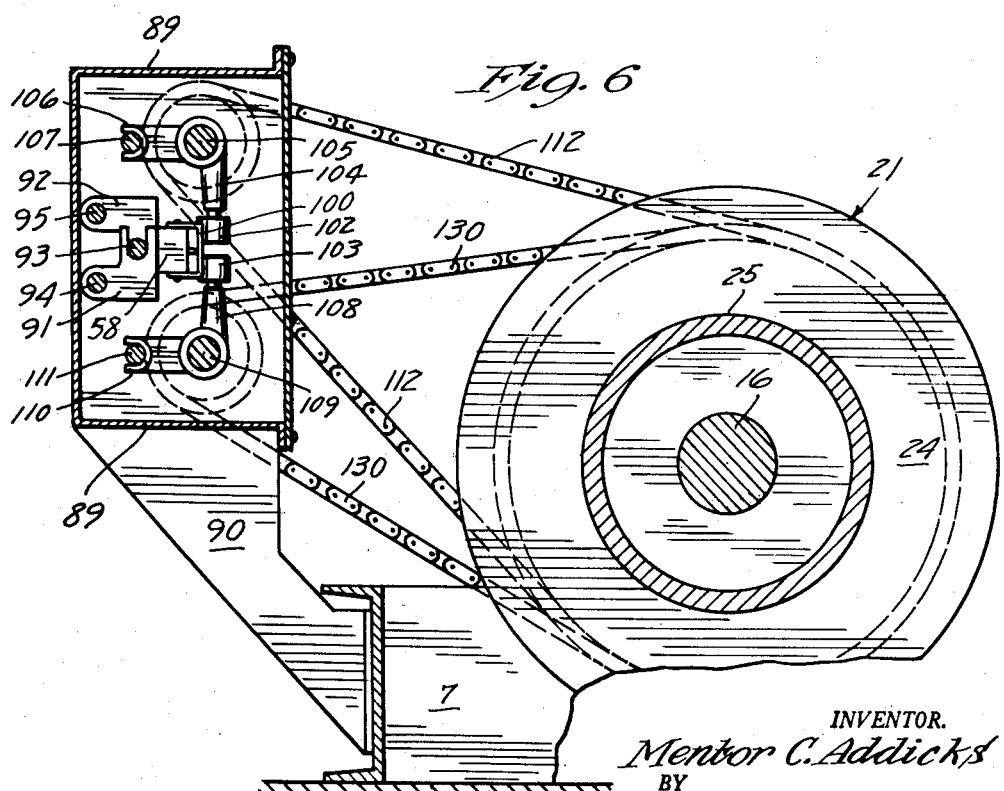
INVENTOR.
Mentor C. Addicks
BY
Merchant & Merchant
ATTORNEYS Feb. 9, 1960　　　　M. C. ADDICKS　　　　2,924,675
AUTOMATIC SHOVELING MACHINES AND THE LIKE
Filed Aug. 9, 1954　　　　　　　　　　　　5 Sheets-Sheet 4
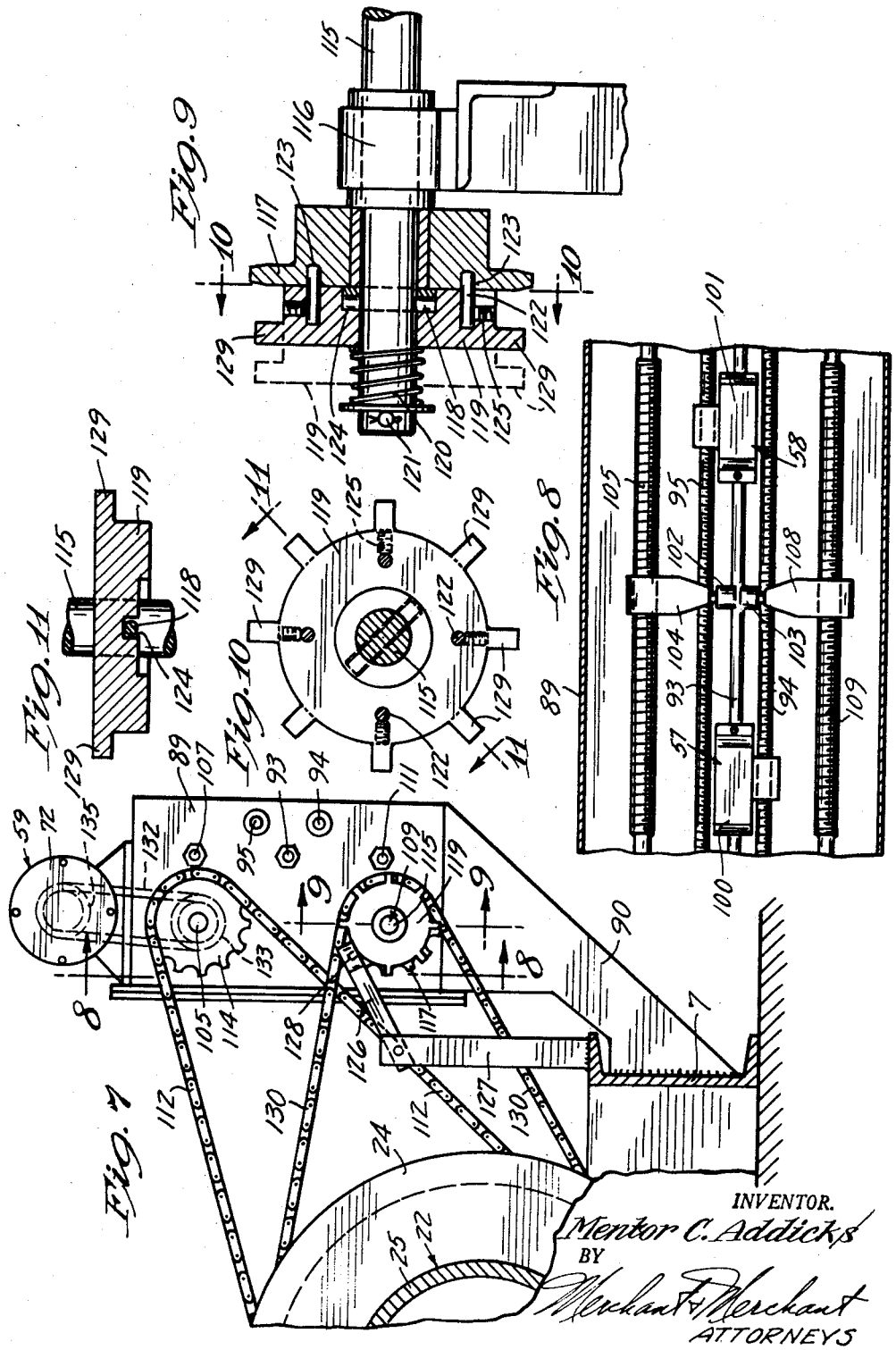
INVENTOR.
Mentor C. Addicks
BY
Merchant & Merchant
ATTORNEYS Feb. 9, 1960
M. C. ADDICKS
2,924,675
AUTOMATIC SHOVELING MACHINES AND THE LIKE
Filed Aug. 9, 1954
5 Sheets-Sheet 5
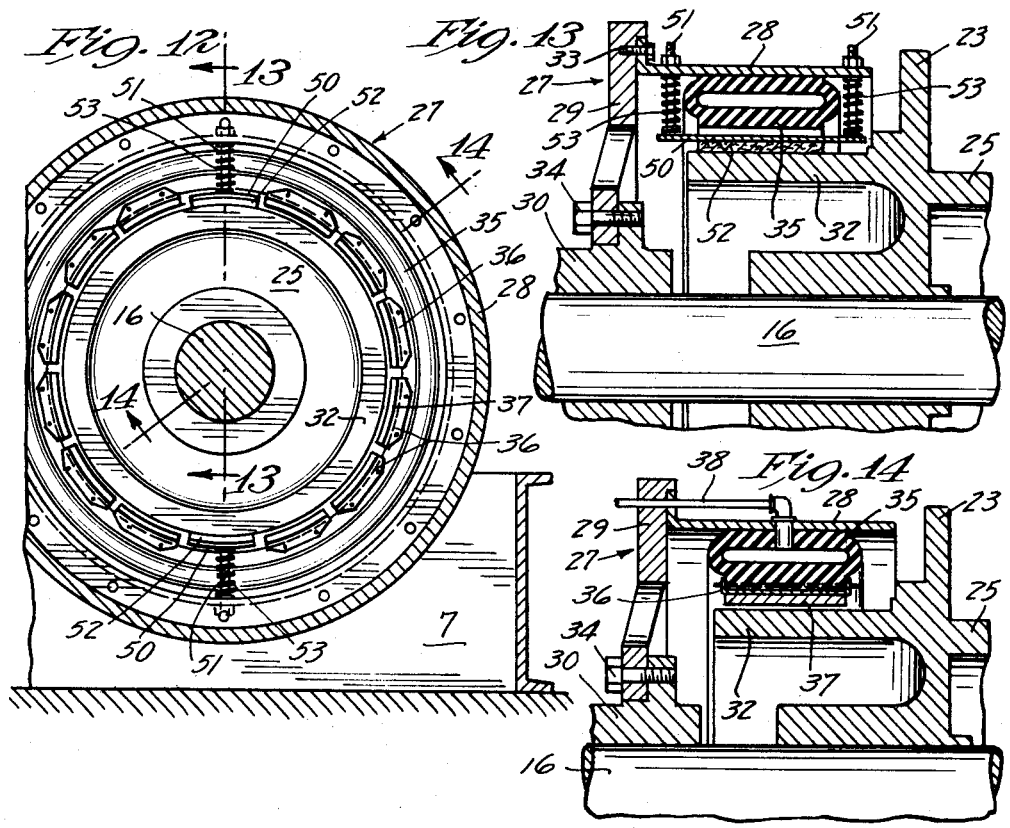
INVENTOR.
Mentor C. Addicks
BY
Merchant & Merchant
ATTORNEYS United States Patent Office 2,924,675
Patented Feb. 9, 1960

2,924,675

AUTOMATIC SHOVELING MACHINES AND THE LIKE

Mentor C. Addicks, Minneapolis, Minn.

Application August 9, 1954, Serial No. 448,696

6 Claims. (Cl. 200—5)

This invention relates to improvements in a control device. In general, the invention relates to a control device for controlling a machine having power operated portions that move alternately in opposite directions. The present invention finds particular utility as the controlling means in a cable winding machine that includes cable winding drums utilized in the movement of bulk material or the like, from one place to another.

This application relates to improvements in inventions disclosed in my prior patents, now identified as Reissue Patents 24,122 and 24,210.

In machines such as cable winding machines, it is customary to provide rotatable drums on which opposite ends of cables are connected for winding and unwinding operations. It is essential to provide means whereby the rotation of the drums is reversed at predetermined intervals to provide for the movement of materials from one place to another. Also, it is essential to be able to vary the length or extent of reciprocal movement of the cables, and the means connected thereto, when moving bulk material such as grain, so as to be able to continuously work into a pile of the aggregate. Under these conditions, it is essential to efficient operation to provide control for the reciprocal movements of the cables so as to constantly vary the length of the stroke and to provide further control in the event the cable does not evenly wind on one of the drums, but tends to pile up in an uneven manner.

The control device forming the present invention finds utility in the field of activity described heretofore, and possibly other uses in the provision of a pair of limit switches that control the driving mechanisms. Suitable actuating means are provided to move between said switches to alternately actuate the switches, and the movement of these actuating means are controlled by the extent of movement of the mechanisms. To provide for reversal of the movement of the mechanisms, an inertia switch is joined in a suitable circuit with the limit switches, and is, in turn, controlled by the limit switch actuating means to appropriately control the circuits. In the avent of an unforeseen difficulty, such as cable piling unevenly on one drum or the other, provision is made for alternate means of actuating the limit switches.

An object of the invention is to provide a control device for controlling the operation of at least two other mechanisms under a number of varying conditions.

Another object is to provide a control device embodying a pair of switches or similar controls utilized to control independent mechanisms, together with a pair of switch actuating members, each of which is driven by independent means, and each of which is capable of actuating either or both of said switches under predetermined conditions.

Another object is to provide a control device embodying a pair of circuit controlling switches supported for relative movement, together with movable switch actuating means, and an inertia switch joined in circuit with the control switches, and which is operatively joined with the switch actuating means so as to be operated by the relative movement of said actuating means.

A further object is to provide a control device embodying a pair of limit switches supported in spaced relationship with each other, each on an independent lead screw, together with a pair of switch actuators, each of which is independently supported on lead screws disposed on opposite sides of the limit switches, and an inertia switch joined in circuit with the limit switches and operated by one of the switch actuating lead screws, to provide for control of independent mechanisms under a variety of varying conditions.

The above and still further highly important objects and advantages of my invention will become apparent from the following detailed specification, appended claims and attached drawings.

Referring to the drawings, which illustrate the invention, and in which like characters indicate like parts throughout the several views:

Fig. 1 is a diagrammatic view in plan and horizontal section illustrating a preferred embodiment of my invention and its use in unloading a freight car or the like;

Fig. 2 is a view in vertical section taken substantially on the line 2—2 of Fig. 1;

Fig. 5 is a fragmentary vertical section taken on the line 5—5 of Fig. 3, on an enlarged scale;

Fig. 6 is an enlarged transverse section taken substantially on the line 6—6 of Fig. 3;

Fig. 7 is an enlarged transverse section taken on the line 7—7 of Fig. 3;

Fig. 8 is a vertical section taken substantially on the line 8—8 of Fig. 7;

Fig. 9 is an enlarged fragmentary detail in section taken substantially on the line 9—9 of Fig. 7;

Fig. 10 is a detail in section taken substantially on the line 10—10 of Fig. 9;

Fig. 11 is a fragmentary section taken substantially one the line 11—11 of Fig. 10;

Fig. 12 is an enlarged fragmentary transverse section taken substantially on the line 12—12 of Fig. 3;

Fig. 13 is an enlarged fragmentary section taken substantially on the line 13—13 of Fig. 12;

Fig. 14 is an enlarged fragmentary section taken substantially on the line 14—14 of Fig. 12;

Fig. 15 is a diagrammatic view of a switch mechanism incorporated in my novel machine; and, Fig. 16 is a wiring diagram.

Figure 3:
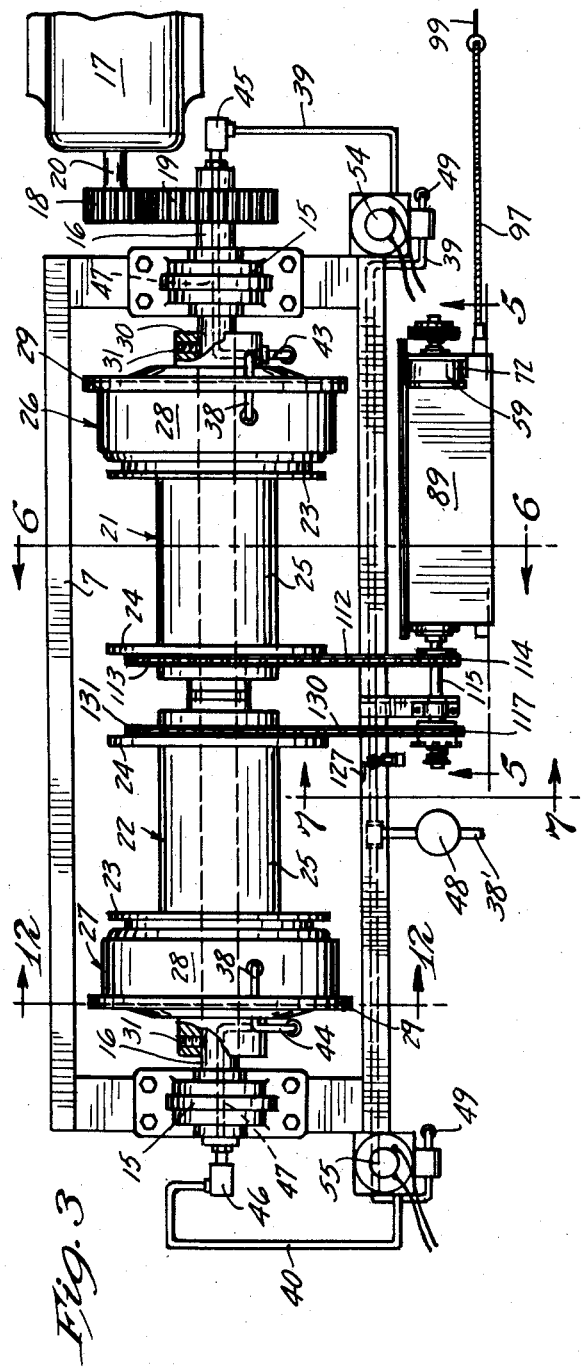
Fig. 3 is a fragmentary view in plan of a single two-drum unit of my invention.

Referring with greater detail to the drawings, and particularly to Figs. 1 and 2, a supporting structure is indicated by the numeral 1, said supporting structure including a receiving platform 2 adjacent a pair of tracks 3 upon which is adapted to rest a conventional boxcar or the like 4. The receiving platform 2 is conventional in nature and is adapted to receive articles or granular material such as grain or the like from the car 4 as the material is shoveled or otherwise moved through the customary opening 5 in the side of the car 4 and at its central portion. Mounted on the supporting structure 1 by means of mounting brackets or the like 6, one of which is shown in Fig. 2, is a frame 7 having mechanism thereon for imparting reciprocatory grain shoveling and return movements to a scoop or shovel 8 which is adapted to be moved between one end portion of the car 4 and the intermediate door opening 5 thereof. The shovel 8 is of the type commonly used to move grain or like bulk material from one place to another, or as shown, to unload grain or like material from a boxcar. The scoop 8 is connected to my novel machine for movements in a car unloading direction by a flexible cable 9 and to the machine for return movements by a second cable 10 which runs over a tail sheave shown diagrammatically in Figs. 1 and 2 and indicated at 11. The tail sheave 11 is of the type commonly used for this purpose and may be secured to either end portion of the boxcar by means of an anchoring bar or the like 12 or by any well known means. For the purpose of clarity, the cable 9 will be hereinafter designated as the pull-forward cable and the cable 10 as the pull-back or return cable.

As shown in Fig. 2, my novel machine is preferably mounted above the level of the door opening 5 of the boxcar 4, and suitable pulleys for guiding the pull-forward cable 9 and the return cable 10 are provided at convenient locations and suitably secured in positions to properly guide said cables, one of the guide pulleys indicated at 13 is mounted closely above the level of the floor of the car 4, while the pulleys of the return cable 10 is preferably mounted at a level above the pulley 13 by suitable means not shown, this second pulley being indicated at 14, see Fig. 2.

The base frame 7 is generally rectangular in shape and is provided at its opposite ends with aligned bearings 15 which journal a drive shaft 16 that is continuously driven from a motor 17 through speed reducing gears 18 and 19. The gear 18 is fixed on the drive shaft 20 of the motor 17, whereas the gear 19 is rigidly secured to the shaft 16. The pull-forward cable 9 has its free end secured to a cable winding drum 21 that is journalled on the drive shaft 16, and the pull-back or return cable 10 has its free end secured to a second drum 22 also journalled on the shaft 16 in axially spaced relationship to the winding drum 21. The drums 21 and 22 are in the nature of spools each having radially outwardly projecting circumferential cable confining flanges 23 and 24, and relatively smooth cylindrical cable engaging surfaces 25 over which the cables 9 and 10 respectively, are wound. As indicated in Figs. 1 and 2, both the pull-forward cable 9 and the return cable 10 are wound on their respective drums 21 and 22 in the same direction of rotation for a purpose which will hereinafter be described.

The drums 21 and 22 are each operatively coupled to the drive shaft 16 by clutch mechanisms indicated in their entirety at 26 and 27 respectively. The clutch mechanisms 26 and 27 are identical. Hence, for the sake of brevity, but one thereof will be described in detail. The clutch mechanisms each comprise a driving element in the nature of a cylindrical casing 28 mounted in concentric relationship to the shaft 16 by means of an annular flange 29 and a hub section 30 which is pinned or otherwise rigidly secured to the drive shaft 16 as indicated at 31; and a driven element 32 in the nature of an axially outwardly extending cylindrical portion integrally formed with its respective winding drum and concentric with the casing member 28, see particularly Figs. 13 and 14. The casing member 28 is rigidly secured to the flange 29 by screws or the like 33 and the flange 29 is anchored to the hub 30 by bolts 34. The casing member 28 carries an annular flexible tube 35 which is adapted to be inflated and deflated so as to expand and contract. The tube 35 carries a plurality of circumferentially spaced shoes 36 each of which is provided with a lining 37 that is adapted to engage the outer cylindrical wall surface of the element 32 upon introduction of fluid under pressure to the interior of the tube 35 whereby to frictionally lock the drum 21 or the drum 22 to the drive shaft 16 for common rotation therewith. The annular flexible tube 35 is of such characteristics, that, in its normal state, will support the shoes 36 and linings 37 thereof out of frictional engagement with the element 32 until fluid under pressure is introduced to the interior of the tube 35. The above described clutch in itself does not comprise the present invention.

Fluid, preferably air, under pressure is admitted selectively to the interiors of the flexible tubular elements 35 from a source of fluid pressure not shown through conduit means including a pipe or tube 38; branch tubes 39 and 40 in which are interposed actuators in the nature of solenoid-operated valves 41 and 42 and relatively short conduits 43 and 44. The branch conduits 39 and 40 terminate in fittings 45 and 46, each of which is coupled to an opposite end of the drive shaft 16, and communicate with internal passages 47 in the shaft 16, which passages communicate with one end of the tubes 43 and 44. As shown, the tubes 43 and 44 terminate in communication with the interiors of the expansible and contractable tubular elements 35 of their respective clutch mechanisms 26 and 27. If desired, a pressure regulator valve 48 is interposed in the delivery conduit 38 whereby a predetermined fluid pressure is built up within the tubular elements 35. The valves 41 and 42 are in the nature of conventional three-way valves, and are adapted to be operated in such a manner that, when it is desired that the clutch mechanisms 26 and 27 be released, the air within the tubular elements 35 will flow outwardly from the valve to atmosphere through relatively short exhaust conduits 49.

When the clutch mechanism 26 is operated to apply high torque driving force to the winding drum 21, the clutch mechanism 27 is automatically released as will hereinafter be described. Winding rotation of the pull-forward drum 21 will cause movement of the cables 9 and 10 in a direction to impart unwinding rotation to the return drum 22 in a direction opposite to the direction of rotation of the drive shaft 16. For the purpose of preventing overrunning of the return drum 22 and consequent backlash in the return cable 10 when the pull-forward drum 21 is stopped, I provide a low torque transfer coupling between the shaft 16 and the return drum 22. Although not shown, the low torque transfer coupling associated with the return drum 22, now to be described, has a counterpart operatively associated with the pull-forward drum 21. The low torque transfer coupling of each of the winding drums comprises one or more driving shoes 50 carried by a housing element 28 of each clutch mechanism by means of nut-equipped studs 51. With reference to Fig. 12, it will be seen that a diametrically opposed pair of these shoes 50 are disposed between adjacent pairs of the high torque transfer coupling shoes 36, and are provided with friction linings 52 that engage the outer cylindrical wall surface of the driven clutch element 32. As seen in Fig. 13, coil compression springs 53 are interposed between the shoes 50 and the casing element 28 on opposite sides of the annular flexible tube 35. The springs 53 yieldingly bias the shoes 50 in an inward direction toward the driven element 32. This inward movement of the shoe 50 is limited by adjustment nuts on the studs 51 which may be adjusted to impose a given torque on the winding drum associated therewith at all times during rotary movement of the shaft 16. The frictional engagement between the liners 52 and the driven elements 32 of the winding drums is sufficient to cause rotation of their respective winding drums when no load is applied thereto, but insufficient to drive said drums when the drums are under a predetermined load. Thus, when the high torque transfer couplings are released, the drums 21 and 22 may be manually rotated in a direction opposite to the direction of rotation of the drive shaft 16. However, when the drums are released from said manual rotating force, the drums will stop immediately and begin to rotate in the direction of rotation of the shaft 16.

The actuator valves 41 and 42 are electrically controlled by solenoids 54 and 55 respectively which are interposed in an electrical control circuit comprising a control relay 56, a pair of normally closed control switches 57 and 58 and a magnetically operated inertia switch 59. With reference to Fig. 16 it will be seen that the solenoids 54 and 55 are connected to one side of a source of electrical potential such as a two-wire power line 60 by means of a lead 61 and branch leads 62 and 63 respectively. The relay 56 comprises a winding 64, a normally open switch 65 and a normally closed switch 66, the branch lead 62 extending from the solenoid 54 to one side of the normally open switch 65 and the branch lead 63 extending from the solenoid 55 to one side of the normally closed relay switch 66. The opposite side of the switch 65 is connected to one side of the normally closed control switch 57 by a lead 67, whereas the opposite side of the relay switch 66 is connected to one side of the control switch 58 by a lead 68 in which is interposed a manually operated switch 69, the purpose of which will hereinafter be described. The winding 64 of the relay 56 is interposed in the lead 61 which lead terminates in connection with the lead 67.

The magnetically operated switch 59 is shown more or less diagrammatically in Fig. 15, and as will be explained hereinafter operates on an inertia principle. This switch comprises a permanent magnet 70 rigidly mounted on the shaft 71 which is journalled in a casing 72 of ferrous metal. A metallic cup-shaped element 73, preferably made from copper or the like, is mounted for rotation in the casing 72 in concentric relation to the shaft 71, and carries a bracket 74 which carries a pair of switch contacts 75 and 76, the former of which engages a cooperating contact 77 and the latter of which engages a cooperating contact 78 mounted on respective pivotal arms 79 and 80 carried within the casing 72. The contacts 75 and 77 may be otherwise defined as comprising a switch 81 and the contacts 76 and 78 may likewise be said to comprise a switch as indicated in its entirety by the numeral 82. A pair of springs 83 are utilized to urge the switches 81 and 82 toward switch closed relationship, and a pair of stop pins or the like 84 are positioned to limit switch closing movements of the pivoted arms 79 and 80. Rotation of the shaft 71 causes eddy currents from the magnetic field which is set up by the permanent magnet 70 and the casing 72, which eddy currents are induced in the copper cup-like element 73. These eddy currents produce a torque which moves the cup-like element 73 in the same direction as that of rotation of the shaft 71. The bracket 74 carried by the cup-like element 73 moves one of the contacts 75 or 76 away from its cooperating contact, thus causing one of the switches 81 or 82 to open while the other thereof remains closed. The arrangement is such that when the shaft 71 is at rest, both switches 81 and 82 are closed. The control switch 57 is connected to the contact 75 of the switch 81 by a lead 85 and the control switch 58 is connected to the contact 76 of the switch 82 by a lead 86. The contacts 77 and 78 of their respective switches 81 and 82 are connected to a common lead 87 which extends to the opposite side of the power conductor from that to which the lead 61 is connected. A manually operated master control switch 88 is interposed in the lead 87 and controls operation of the entire control system.

The control switches 57 and 58 are mounted for movements toward and away from each other within a control box 89 which is rigidly secured to the frame 7 by means of mounting brackets or the like 90. The control switches 57 and 58 are carried by brackets 91 and 92 respectively that are mounted and guided for sliding movements longitudinally of the control box 89 on a guide bar 93. The bracket 91 is screw threaded to receive a threaded shaft 94 in spaced parallel relationship to the guide bar or rod 93 and journalled in opposite ends of the control box 89. Likewise, the bracket 92 is threaded to receive a threaded shaft 95 which is disposed in spaced parallel relationship to the guide rod 93 and shaft 94, and which also is journalled in opposite ends of the control box 89. A pair of flexible shafts 96 and 97 are each connected at one end to a respective threaded shaft 94 and 95, and at their other ends are provided with operating cranks or the like 98 and 99 respectively. The flexible shafts 96 and 97 are preferably of such length that the operator may stand at a selected position remote from the winding drums and from whence operation of the scoop or shovel 8 may be observed to the best advantage. The switches 57 and 58 are provided with operating arms or members 100 and 101 respectively that lie in the paths of travel of a pair of switch operating members in the nature of rollers 102 and 103. The switch operating roller 102 is mounted on a carriage 104 that is mounted on and has screw threaded engagement with a threaded operating shaft 105 journalled at its opposite end portions in opposite ends of the control box 89. The bracket 104 is provided with a bifurcated end 106 which engages a guide rod 107 in spaced parallel relation to the shaft 105 and which is anchored at its opposite ends in the opposite ends of the control box 89. In like manner, the switch operating member or roller 103 is mounted on a bracket 108 that is carried by and has screw threaded engagement with a threaded shaft 109 journalled in opposite ends of the control box 89. The bracket 108 also has a bifurcated end portion 110 which engages a guide roll 111 in spaced parallel relation to the shaft 109 and which also is anchored at its opposite ends in the opposite end walls of the control box 89.

With reference particularly to Fig. 8, it will be seen that the operating arms 100 and 101 are each engageable by both of the switch operating rollers 102 and 103 upon movements of their respective brackets 104 and 108 in opposite directions. Means for rotating the shaft 105 to impart switch operating movement to the switch operating roller 102 comprises an endless link chain 112 which runs over a relatively large sprocket wheel 113 rigidly secured to the flange 24 of the winding drum 21 and a relatively small sprocket wheel 114 rigidly secured to an outwardly projecting end of the threaded shaft 105. The threaded shaft 109 has an outwardly extended end portion 115 which is journalled in an outboard bearing 116. A sprocket wheel 117 is journalled for rotation on the outer end portion 115 and is interposed between the outboard bearing 116 and a drive pin 118 extending diametrically through the shaft portion 115. A manually operated clutch member 119 is mounted on the outer end portion 115 axially outwardly of the sprocket wheel 117 for rotary and axial sliding movements, and is yieldingly urged toward the sprocket wheel 117 by a coil compression spring 120 interposed between the clutch member 119 and a washer-equipped stop pin 121 at the extreme end of the shaft 109, see Fig. 9. The clutch member 119 is provided with a plurality of circumferentially spaced axially inwardly extending pins 122 which are receivable in recesses 123 in the adjacent face of the sprocket 117. The clutch member 119 is further provided with a diametrically extending recess 124 which receives the drive pin 118 when the pins 122 are received within their respective recesses 123, see Figs. 9, 10 and 11. Preferably, the pins 122 are anchored in the clutch member 119 by means of set screws or the like 125. From the above it should be obvious that, when the clutch member 119 is moved from its full line position of Fig. 9 to its dotted line position thereof against bias of the spring 120, the pins 122 will be moved out of their respective recesses 123, and the drive pin 118 will be axially removed from engagement with the walls of the recess 124. Thus, when the clutch member 119 is moved to its dotted line position of Fig. 9, the sprocket 117 will be freely rotatable with respect to the shaft 109. Means for holding the clutch member 119 out of engagement with the sprocket 117 and the drive pin 118 comprises a locking bar 126 that is pivotally secured at one end to the upper end of a standard 127, and which at its free end is provided with an opening or pocket 128 that is adapted to receive any one of a plurality of circumferentially spaced lugs 129 that project radially outwardly from the clutch member 119, when the clutch member 119 is moved to its dotted line position of Fig. 9. An endless link chain 130 runs over the sprocket wheel 117 and a relatively large sprocket wheel 131 similar to the sprocket wheel 113 but rigidly secured to the flange 24 of the winding drum 22.

The magnetically operated inertia switch 59 is bolted or otherwise secured to the top of the control box 89 and is driven from the shaft 105 by a link chain 132 running over a sprocket wheel 133 on an extended portion 134 of the shaft 105, and a second sprocket 135 rigidly mounted on the shaft 71 of the switch 59.

Automatic operation

Figure 4:
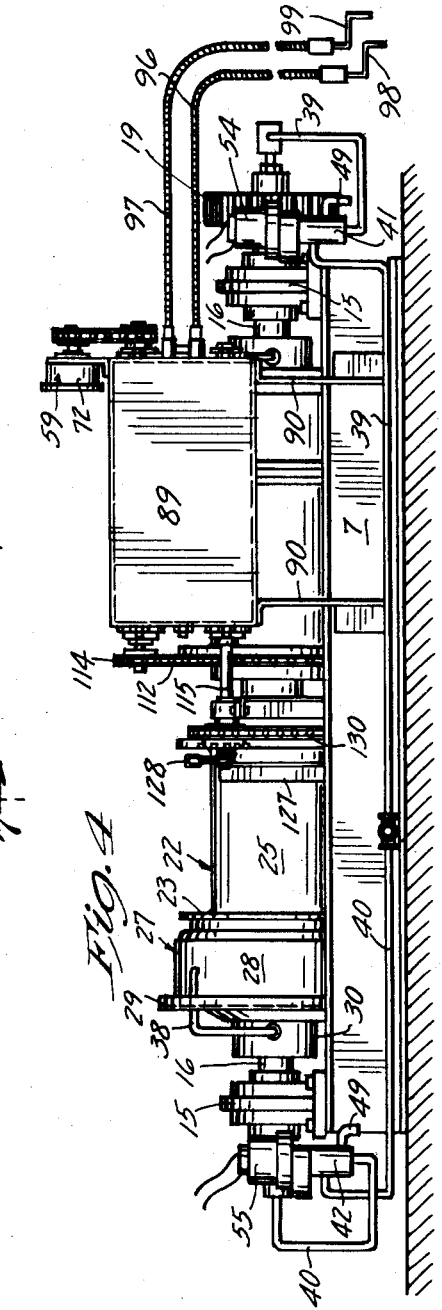
Fig. 4 is a view in side elevation of the machine of Fig. 3.

When it is desired to use the machine of Figs. 1 to 16 inclusive to automatically unload grain or the like from a freight car, as indicated in Figs. 1 and 2, the operator fastens the tail sheave 11 to the corner bar 12 and causes the motor 17 to be energized by conventional means not shown. The operator then closes the manually operated switches 69 and 88 whereby to close the circuit between the magnetic inertia switch 59, the control switch 58, the relay switch 66 and the valve solenoid 55, whereby to cause fluid under pressure to be introduced to the high torque transfer coupling or clutch 27. Setting of the clutch 27 causes the pull-back drum 22 to rotate in a direction to move the scoop or shovel 8 rearwardly toward the tail sheave 11. Assuming that the clutch member 119 is in operative engagement with the driving pin 118 and the sprocket wheel 117, rotation of the drum 22 causes similar rotation to be imparted to the shaft 109 in the control box 89 in a direction to move the switch operating roller 103 toward operative engagement with the switch 58. During this time, the pull-forward cable 9 is being unwound from the winding drum 21, said drum 21 being rotated thereby in a direction opposite to that of the drive shaft 16 and the winding drum 22. This rotation of the drum 21, is transferred to the threaded shaft 105 through the sprockets 113 and 114 and the chain 112, whereby to move the switch operating roller 102 also toward operative engagement with the control switch 58. Simultaneously, the shaft 71 of the magnetic inertia switch 59 is rotated in a direction to close the switch contacts 76 and 78 and open the contacts 75 and 77. The control switches 57 and 58 are so positioned in the control box 89 with respect to the switch operating rollers 102 and 103 that, when the shovel 8 reaches a predetermined position in its travel toward the tail sheave 11, one of the rollers 102 or 103 will engage the operating arm 101 of the switch 58 to open the switch and break the circuit to the solenoid 55, thus causing the clutch 27 to become uncoupled and rotation of the pull-back winding drum 22 to cease. At this point it will be noted that the low torque transfer couplings or shoes 50 of each clutch mechanism 26 and 27 tend to cause rotation of both drums 21 and 22 in the direction of rotation of the drive shaft 16. Thus, when the circuit is opened, the torque of the drum 21 in a cable winding direction is equal to that of the winding drum 22 in the same direction. Thus both drums become stationary at the end of traveling movement of the scoop 8 in a pull-back direction. Further, the drag placed upon the unwinding drum 21 by the low torque transfer coupling thereof during rearward movement of the scoop 8 prevents overrunning of the drum 21 in an unwinding direction when the scoop reaches its limit of rearward travel, and consequent backlash in the cable 9.

Immediately upon cessation of rotation of the drum 22, the magnetic inertia switch 59 assumes a condition wherein both switches 81 and 82 thereof are closed. When this occurs, a circuit is closed through the coil or winding 64 of the relay 56 through the leads 61 and 67, the control switch 57 and the leads 85 and 87, to open the switch 66 and close the switch 65. Closing of the switch 65 causes a circuit to be completed through the valve operating solenoid 54 through leads 61 and 62, the switch 65, lead 67, the closed control switch 57, the lead 85, the switch 81 and lead 87. Energization of the solenoid 54 causes the valve 41 to admit fluid under pressure to the clutch 26 whereby to operatively couple the pull-forward winding drum 21 to the drive shaft 16. Then pull-forward cable 9 winds upon the drum 21 and the scoop 8 is moved in a forward direction from the end of the car 4 toward the central opening 5 therein, the pull-back cable 10 being inward from the drum 22 and causing rotation of the drum 22 in the direction of rotation opposite that of the drive shaft 16. Inasmuch as the drums 21 and 22 rotate in a reverse direction to that above described in connection with the rearward movement of the scoop 8, the threaded shafts 105 and 109 also rotate in a reverse direction to that above described. Thus, during forward movement of the shovel 8 toward the central opening 5 in the car 4, the switch operating rollers 102 and 103 move away from engagement with the switch operating arm 101 and toward the switch operating arm 100 operatively associated with the switch 57. During this movement, the shaft 71 of the magnetic inertia switch 59 rotates in a direction to cause opening of the switch 82 and closing of the switch 81. It will be noted that the switch 82 opens before the rollers have left the switch operating arm 101 of the control switch 58, so that the circuit through the valve solenoid 55 remains open and the solenoid 55 deenergized during forward movement of the shovel 8. Furthermore, this circuit is also broken through the open switch 66 of the relay 56.

Opening of the control switch 57 by either of the switch operating rollers 102 or 103 causes the circuit of the relay 56 to be broken, thus deenergizing the relay coil 64 with consequent opening of the switch 65 and closing of the switch 66. At this point, both switches 81 and 82 of the magnetic inertia switch mechanism 59 are closed, the circuit to the solenoid 54 being broken through the control switch 57 and relay switch 65, and the circuit of the solenoid 55 being closed to cause another cycle of rearward travel to be imparted to the scoop or shovel 8. From the above it should be obvious that the direction of rotation of the winding drums 21 and 22 will be automatically reversed at the end of each traveling movement of the shovel 8 until the circuit is broken by the opening of switch 88. It should further be realized that the distance of traveling movement is regulated by the operator through manipulation of either of the cranks 98 or 99, and that both cranks may be utilized to shift the range of movement of the scoop 8. Thus, when the car or bin is relatively full of material to be discharged, the operator can manipulate the cranks 98 and 99 to cause the scoop 8 to travel for relatively short distances, and as the bin or car becomes more empty, the operator can cause the range of travel of the scoop 8 to be extended toward the tail sheave 11. With this arrangement, a car or bin may be unloaded with a minimum loss of time.

Semi-automatic operation

The automatic operation above-described of my novel machine unloads the major portion of a bin or car between one end thereof and the central opening 5. To remove the residue, the scoop 8 is disconnected from the cables 9 and 10, and a handle-equipped scoop 8a is connected to the pull-forward cable 9. The pull-back cable 10 is removed from the tail sheave 11 and allowed to wind up on the winding drum 22 under low torque transfer coupling imparted rotation of the drum 22. It will be noted, with reference to Fig. 1, that I have shown a pair of the above-described machines coupled together by a shaft extension 16a. The above-described machine being indicated in its entirety at A and the second similar machine being indicated at B. With such an arrangement, after one end of the car 4 has been, for the most part, emptied by automatic operation, said one end may be cleaned up under semi-automatic operation of the machine B while the opposite end of the car 4 is subject to automatic operation of the machine A.

After the clean-up shovel 8a has been coupled to the pull-forward cable 9, the switch 69 is opened, whereby to render the solenoid 55 inoperative to cause high torque transfer coupling imparted rotation to the pull-back drum 22, and the clutch member 119 is manually moved to its inoperative dotted line position of Fig. 9 and locked in this position by the locking arm 126. Then, when the switch 88 is reclosed, the relay 56 becomes energized to close the switch 65 and cause forward movement to be imparted to the scoop 8a which is guided manually by the operator until the switch operating roller 102 causes opening of the switch 57. During this forward movement of the scoop, the switch 81 remains closed. As soon as the scoop 8a has reached its limit of forward travel, the operator pulls the same manually rearwardly against the action of the low torque transfer coupling associated with the pull-forward drum 21 causing the control switch 57 to become reclosed. However, before the switch 57 recloses, the switch 81 of the inertia switch mechanism 59 opens due to rotation of the inertia switch shaft 71 in the opposite direction, and the circuit remains open until the operator ceases to pull rearwardly on the scoop 8a. When the operator stops his rearward movement, the inertia switch shaft ceases to rotate, and the eddy currents built up by the permanent magnet 70 subside to permit reclosing of the switch 81; whereupon the solenoid 54 will again be energized to cause the pull-forward drum to rotate in a direction to pull the scoop 8a toward the opening 5 in the car 4. During this movement the operator guides the scoop 8a in a manner to effectively remove substantially all of the granular material remaining in that portion of the bin or car. The closing action of the switch 81 is sufficiently slow to permit the operator to place the scoop 8a to best advantage after he has stopped his rearward pulling movement thereon, whereby to clean up the car with the fewest possible cleaning strokes or traveling movements of the scoop 8a.

The arrangement whereby both switch operating rollers 102 and 103 are adapted to engage the switch operating arms 100 and 101 of the switches 57 and 58 respectively provides compensation for uneven winding of the cables 9 and 10 on their respective drums 21 and 22. For example, if the pull-forward cable 9 tends to pile up on one portion of its winding drum 21 instead of being coiled in even layers thereon, the unwinding drum 22 will rotate at a faster rate than does the winding drum 21 in a winding direction. Thus, the switch operating roller 103 will reach and open the switch 57 before the roller 102 reaches said switch whereby to open the switch 57 at the correct point in the forward travel of the scoop 8. Obviously, the reverse of this situation holds true during rearward movement of the scoop 8 and over travel of the scoop 8 in either direction is thereby avoided. When the machine is changed over from automatic to semi-automatic operation, the operator needs only to be sure that the operating roller 103 is not in operating engagement with the switch 57 at the time of uncoupling of the clutch member 119 from the sprocket wheel 117. The operator may make sure that the switch operating roller 103 is out of operative engagement with the control switch 57 by opening the switch 88 when the scoop 8 is at its rearward limit of travel, at which time the roller 103 is in engagement with the control switch 58, which control switch is removed from the operating circuit during semi-automatic operation of the machine by means of the opened switch 69. With reference to the function of the magnetically operated or inertia switch during automatic operation of the machine, it will be noted that the time delay set up in the switch 59, particularly at the end of rearward travel of the shovel or scoop 8, permits the scoop to settle into the material before forward movement is imparted thereto, thereby insuring a fully loaded scoop during each forward travel thereof.

While I have shown and described a single form of my invention, various other arrangements may suggest themselves to those skilled in the art. My invention is capable of various modifications and such modifications may be made within the spirit and scope of the invention as defined in the claims.

What I claim is:

1. A control device, comprising a pair of switches, means supporting said switches in laterally spaced alignment with respect to each other, a pair of switch operating members disposed between said switches and in alignment with both of said switches, and a pair of independently driven members, each of which is operatively connected to one of said switch operating members and disposed in parallel relationship with each other and each adapted to move its respective switch operating member between positions of operative engagement with each of said switches.

2. The structure defined in claim 1, in combination with said switches of means for independently moving each of said switches with respect to the other switch to vary the distance between said switches.

3. A control device, comprising a support, a pair of lead screws journaled on said support in parallel relationship with each other, a pair of switches each carried by one of said lead screws and disposed in alignment with the other switch, a second pair of lead screws journaled on said support in parallel relationship with said first pair of lead screws, and a pair of switch actuators, each carried by one of said second pair of lead screws and disposed between said pair of switches, and in alignment with both of said switches for alternate movement between said switches.

4. A control device, comprising a pair of switches, means supporting said switches in laterally spaced alignment with respect to each other, a pair of switch operating members disposed between said switches and in alignment with both of said switches, a pair of independently driven members each of which is operatively connected to one of said switch operating members and adapted to move its respective switch operating member between positions of operative engagement with each of said switches, and a two pole switch joined in circuit relationship with each of said first named switches and operatively connected to one of said driven members for movement between its two poles.

5. A control device, comprising a pair of switches, means supporting said switches in laterally spaced alignment with respect to each other, a pair of switch operating members disposed between said switches and in alignment with both of said switches, a pair of independently driven members each of which is operatively connected to one of said switch operating members and adapted to move its respective switch operating member between positions of operative engagement with each of said switches, and a pair of inertia operated switches in said circuit operatively connected to one of said driven members and alternately actuated by cessation of movement of said driven member in opposite directions.

6. A control device, comprising a support, a pair of lead screws journaled on said support in parallel relationship with each other, a pair of switches each carried by one of said lead screws and disposed in alignment with each other on said support, a pair of switch operating members between said switches and in alignment with both of said switches, a pair of driven members journaled on said support in parallel relationship with said lead screws and each operatively connected to a respective one of said switch operating members and adapted to move said member in opposite directions between operative engagement with said switches, and a two pole magnetic inertia switch joined in circuit relationship with both of said switches and operatively connected to one of said driven members and actuated by the relative movement of said driven member.

References Cited in the file of this patent

UNITED STATES PATENTS

| | | |
|---|---|---|
| 786,809 | Herzog | Apr. 11, 1905 |
| 846,960 | Small | Mar. 12, 1907 |
| 1,512,167 | Gore | Oct. 21, 1924 |
| 1,666,925 | Benjamin | Apr. 24, 1928 |
| 1,675,847 | Fisher | July 3, 1928 |
| 1,757,124 | Lauferbar | May 6, 1930 |
| 1,935,124 | Leeson | Nov. 14, 1933 |
| 2,023,139 | Kessler | Dec. 3, 1935 |
| 2,141,278 | Owens | Dec. 27, 1938 |
| 2,522,377 | Kelley | Sept. 12, 1950 |
| 2,551,761 | Peterson | May 8, 1951 |
| 2,635,851 | Maier | Apr. 21, 1953 |
| 2,646,965 | Addicks | July 28, 1953 |
| 2,676,272 | Byrd | Apr. 20, 1954 |